United States Patent [19]

Allina

[11] Patent Number: 5,148,345
[45] Date of Patent: * Sep. 15, 1992

[54] PREPACKAGED ELECTRICAL TRANSIENT SURGE PROTECTION

[76] Inventor: Edward F. Allina, 605 Capri Blvd., Treasure Island, Fla. 33706

[*] Notice: The portion of the term of this patent subsequent to Mar. 6, 2007 has been disclaimed.

[21] Appl. No.: 488,677

[22] Filed: Mar. 5, 1990

Related U.S. Application Data

[63] Continuation-in-part of Ser. No. 286,446, Dec. 19, 1988, Pat. No. 4,907,119, which is a continuation-in-part of Ser. No. 923,524, Oct. 28, 1986, Pat. No. 4,931,895, and a continuation-in-part of Ser. No. 123,419, Jan. 12, 1988, Pat. No. 4,901,187, and a continuation-in-part of Ser. No. 185,584, Apr. 22, 1988, abandoned, and a continuation-in-part of Ser. No. 185,587, Apr. 22, 1988, Pat. No. 4,866,560.

[51] Int. Cl.$^5$ .............................................. H02H 9/04
[52] U.S. Cl. .................................. 361/104; 361/124; 361/127
[58] Field of Search .............. 361/117, 127, 366, 104, 361/126, 56, 124

[56] References Cited

U.S. PATENT DOCUMENTS

| | | | |
|---|---|---|---|
| 4,439,807 | 3/1984 | Reitz | 361/56 |
| 4,740,859 | 4/1988 | Little | 361/56 |

Primary Examiner—Todd E. DeBoer
Attorney, Agent, or Firm—Charles A. McClure

[57] ABSTRACT

Electrical transient surge protection of electrical equipment downstream from a power source plus safeguarding of apparatus for providing such surge protection against failure at high currents or high temperature. Distributed-resistance fuse links facilitate operation of non-linear over-voltage means, such as varistors, in clipping transient voltage surges and shunting resulting currents to ground so as to protect watt-hour meters and downstream loads from electrical surges, and to safeguard such varistors from failure. Such apparatus may be located in such diverse places as a power line weatherhead, a watt-hour meter base, an adapter between a meter base and its normal mounting socket, or a utility panel having such a socket, or in a circuit-breaker panel downstream of the meter and upstream of metered loads.

4 Claims, 2 Drawing Sheets

PREPACKAGED ELECTRICAL TRANSIENT SURGE PROTECTION

This patent application is a continuation-in-part of my copending application Ser. No. 286,446 filed Dec. 20, 1988, scheduled to issue as U.S. Pat. No. 4,907,119, which itself was a continuation-in-part of each of my following prior copending patent applications: Ser. No. 923,524 filed Oct. 28, 1986, to issue as U.S. Pat. No. 4,931,895; and Ser. No. 123,419 filed Jan. 12, 1988, now U.S. Pat. No. 4,901,187; and Ser. Nos. 185,584, now abandoned, and 185,587, the latter to issue as U.S. Pat. No. 4,866,560—both filed Apr. 22, 1988. The contents of those applications are hereby incorporated herein by this reference.

FIELD OF THE INVENTION

This invention relates to packaged electrical transient surge protectors and especially physical modification thereof to improve their capability of protecting downstream electrical equipment from being damaged by surge currents in the tens of thousands of amperes.

BACKGROUND OF THE INVENTION

The present inventor has spearheaded the adoption of electrical transient surge protectors in plug-in adapters inserted between the usual watt-hour meter and its socket, as disclosed in his issued patents and other copending patent applications identified above.

Similar protection against transient electrical surges may be installed instead (or in addition) at nearby upstream locations, such as a weatherhead, or downstream locations, such as a utility power panel, and may either be built-in or be added thereto in prepackaged form. Applicant's surge-protective apparatus utilizes varistors or equivalent non-linear resistance means as components in their usual disklike form, whether partially prepackaged or not.

A known type of downstream surge-protective device is often packaged in so-called "grenade" form. An example of such device is disclosed by Reitz as a "Secondary Arrester" in U.S. Pat. No. 4,439,807.

A common feature of packaged forms of surge protectors is lack of capacity to carry extreme current densities, such as often result on power lines, as from lightning. A metal oxide varistor can shunt considerable surge current to ground and thereby protect downstream equipment, but repeated surge conduction increases the likelihood of failure in associated equipment or in surge-protection apparatus itself, if cooling time and paths are inadequate. Varistors may get so hot therefrom as to reach a characteristic failure temperature, resulting in loss of physical integrity—perhaps explosively.

Rather than to rely upon the installers of prepackaged surge-protective equipment to provide adequate local fusing to protect it from possible overloading and failure, it is preferable to include in the package means to increase its current-carrying capacity, to inhibit its temperature rise, and lastly to disconnect it entirely.

The present inventor has pioneered increases in surge capacity and safety of such surge-protective apparatus by heat-sinking component varistors (as in the earliest filed of his above mentioned patent applications, to issue as U.S. Pat. No. 4,931,895); by inserting temperature-responsive or "thermal" fuses or similar cutoff devices to sense the temperature of the varistors and to disconnect them from the power lines in the rare but possible event of excessive temperature rise (as in his U.S. Pat. No. 4,866,560); by stacking varistor disks in parallel circuit therein (as in his U.S. Pat. No. 4,901,187); and by including distributed-resistance fuse links—with and without thermal cutoff means and/or varistor stacking—between power line leads and such varistors (as in his U.S. Pat. No. 4,907,119).

The present invention relates to extension of such improvements exemplified in a prepackaged (such as a "grenade") type of surge-protective apparatus but also suitable for use in a surge-protection device in a weatherhead, meter adapter, utility panel, or elsewhere.

SUMMARY OF THE INVENTION

In general, the objects of the present invention are attained, in methods of electrical transient surge protection utilizing over-voltage sensitive means, such as varistors, by providing fuse links located between power line leads and such varistors and having their electrical resistance distributed substantially evenly along their entire length. Such usage is compatible with various combinations of over-voltage, over-current, and over-temperature protection, such as may include parallel stacking of varistors, ground plane heat-sinking of varistors, and/or thermal fuse safeguarding of varistors.

Apparatus of this invention preferably includes an electrically non-conductive housing containing for each phase of an electrical power source at least one varistor in disklike form connected at one face to a power line phase lead through a distributed-resistance fuse link and connected at the opposite face to an external ground. Exemplified here is a conventional "grenade" housing of triangular or hexagonal cross-section with alternating wide flat sides and relatively narrow arcuate sides (or apex edges) capped at one end, and having protruding from its other end electrical leads to external power and ground leads or terminals.

A primary object of the present invention is to provide heavy duty electrical transient surge protection in a compact housing.

Another object of the invention is to enhance the capacity of varistors for treating large transient electrical surges.

A further object is to provide improved over-current fusing of surge-protective varistors shunting surge currents to ground.

Yet another object is to accomplish two or more of the foregoing objects simultaneously and economically.

Other objects of the present invention, together with means and methods for attaining the various objects, will become apparent from the following descriptive text and the accompanying diagrams, all presented here by way of example rather than limitation.

SUMMARY OF THE DRAWINGS

FIG. 1A is an electrical schematic diagram of primitive fusing of electrical leads to a downstream location from a power source;

FIG. 1B is a similar schematic diagram including spark gaps as an over-voltage means; and FIG. 1C is a similar schematic diagram in which the spark gaps of FIG. 1B have been replaced by variable-resistance over-voltage means, viz., varistors.

DETAILED DESCRIPTION

Figure 1A:
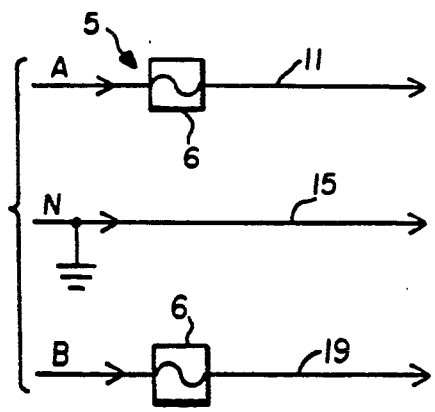
Figs. 1A to 1C represent schematically electrical transient surge-protection embodiments of the prior art.

FIG. 1A shows schematically an arrangement 5 of the prior art. At the left are power lines A, N, and B connecting (arrows at left) respectively to leads 11, 15, and 19 directed (arrows at right) to electrical load equipment downstream—not shown. Neutral line N is grounded; formerly it was often missing and/or combined with one of the other lines. Leads 11 and 19 from respective phase lines A and B contain localized-resistance fuses 6 (one each) of the prior art. Such an overcurrent device obstructs electrical current flow much as a constriction in a fluid conduit "bottle-necks" flow of fluid therethrough, absorbing energy from the flow in doing so.

It will be understood that an additional phase line (not shown) is to be added for three-phase power operation. An added phase line would have with the same described features as phase line A or B.

A conventional fuse melts and opens the circuit when current (averaged over a not-too-short and yet not-too-long period of time) occasions such an $I^2R$ energy transfer as to heat the fuse above its actuation (melting) temperature. Inasmuch as electrical transients are exceedingly brief even though extremely high in voltage, such a conventionally fused arrangement limits surge-handling capability by fusing prematurely because of its high-resistance "hot spots."

Figure 1B:
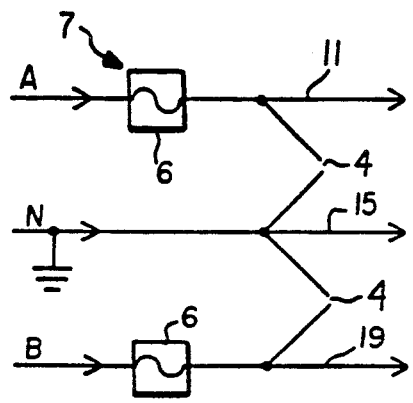

FIG. 1B shows similarly another arrangement 7 of the prior art, with spark gaps 4 to grounded lead 15 from each of phase leads 11 and 19. Such over-voltage means does not conduct at ordinary power voltages but only at considerably higher voltage, whereupon it does provide some surge protection. However, as both the breakdown and conduction voltages tend to vary with the atmospheric conditions as well as the condition of the spark gap, and as the arc temperature and follow-through current are undesirable, especially at a power customer's location, such a primitive arrangement is of marginal benefit and has become obsolescent except in giant form on power line poles, towers, etc.

Figure 1C:
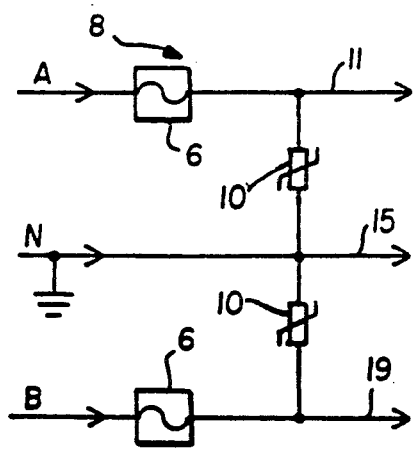

FIG. 1C shows more up-to-date arrangement 8 of the prior art, in which the spark gaps have been replaced by varistors 10, commonly sintered metal oxides or equivalent materials in disklike or wafer form, which conduct very little at ordinary power voltages but conduct disproportionately well at higher voltages. Such an arrangement provides substantial protection for downstream equipment though not necessarily for the varistors, which may increase in temperature from frequent surges that average out less than the current tolerated by the conventional localized-resistance fuses. Varistors have characteristic failure temperatures at which their structural integrity is impaired, and above which they may suffer catastrophic destruction—which itself may damage equipment nearby and also may result in a fire that could be even more broadly damaging.

Figure 1D:
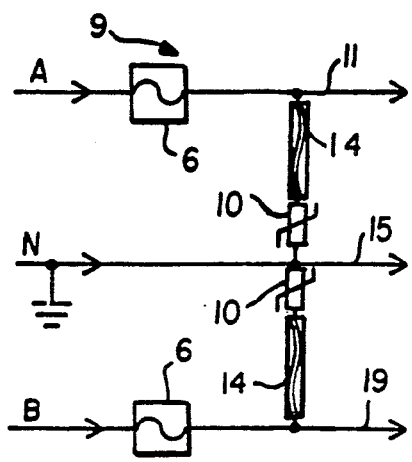
FIG. 1D is a similar schematic diagram in which the varistors of FIG.. 1C have been supplemented by distributed-resistance fuse links from the power lines according to the present invention.

FIG. 1D shows arrangement 9 according to the present invention differing from that of FIG. 1C of the prior art by addition of fuse links 14, one each between power line leads 11 and 19 and varistors 10 from the respective leads to ground lead 15. Unlike localized-resistance fuses 6 in the respective phase leads, fuse links 14 have their resistance distributed substantially evenly therealong. The fuse links are shown schematically so as to suggest both greater diameter and length than conventional fuses 6. A distributed-resistance fuse link is of substantially lower resistance per unit length at surge pulse-widths than such a localized-resistance fuse and is more likely to be jacketed rather than enclosed in a housing.

A distributed-resistance fuse link is flexible and preferably has a flexible insulating jacket of fabric or plastic film, so it can be bent to fit between terminals spaced closer together than its straight end-to-end length. Such a fuse link benefits surge protection equipment by the manifest facility with which it conducts surge currents, by its tolerance of extremely high currents of very short duration in transient surges, and also by operating characteristics not hitherto recognized, such as waveguide-like (e.g., skin effect) transmittal of very high frequencies characteristic of transient surges, and also thermal sharing or heat-sinking action because its large mass is more nearly comparable with that of the varistors.

Figure 2A:
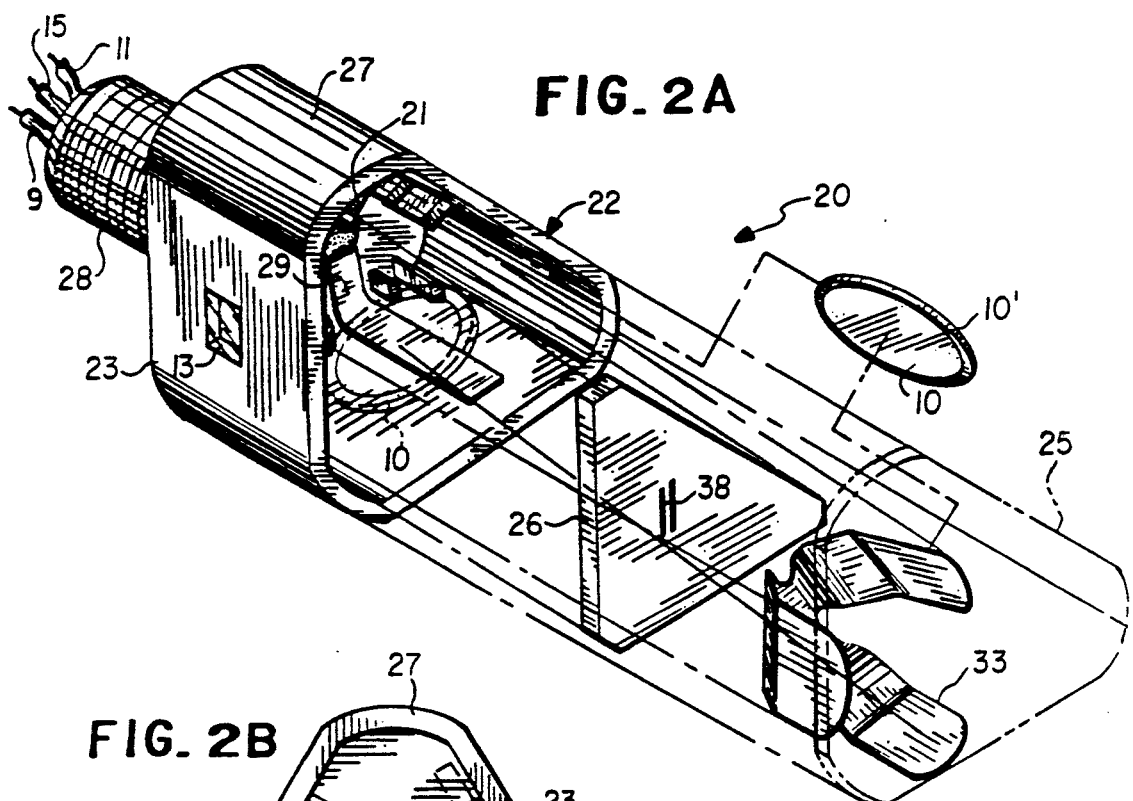
FIG. 2A is an exploded perspective view of an embodiment of this invention.
Figure 2B:
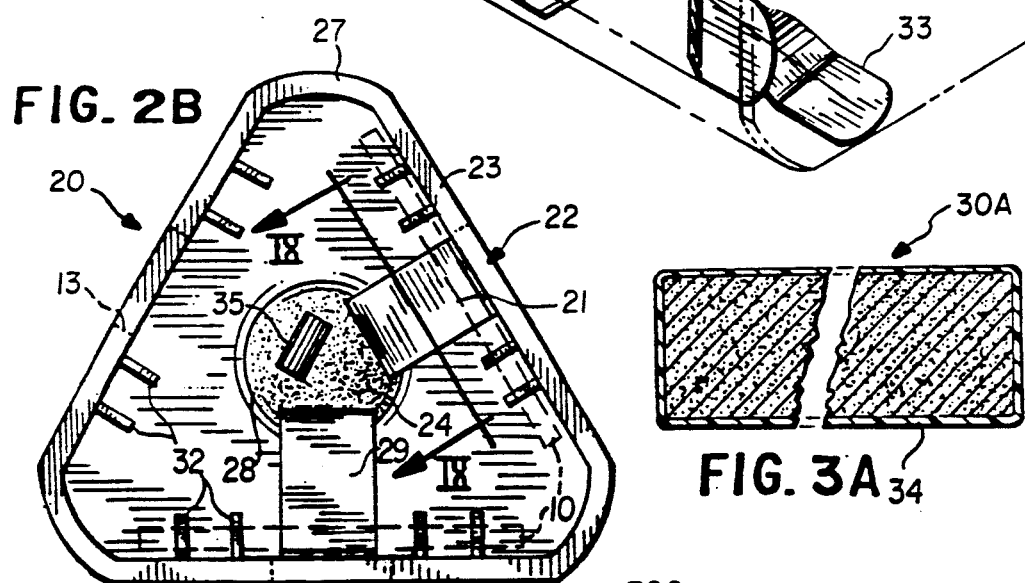
FIG. 2B is a plan view of the FIG. 2A apparatus (less cover)

FIGS. 2A and 2B show embodiment 20 of electrical transient surge protection means of this invention. FIG. 2A is in perspective and partially exploded for clarity of assembly, whereas FIG. 2B is in plan, looking in on housing 22 and its contents before being closed off by cover 25 (indicated by broken lines). For convenience of description, the end of housing 22 closed by the mentioned cover is taken as the top notwithstanding that such end is shown lower than the opposite end (or bottom) in FIG. 2A. The housing has open-ended externally threaded fitting 28 at its far (bottom) end, which electrical leads 11, 15, and 19 pass through to an external power source (not visible here).

Housing 22 is polygonal in transverse cross-section and is more particularly substantially hexagonal, with three relatively wide flat sidewalls 23 (one or more with a translucent window 13 therein) alternating with a like number of relatively narrower arcuately curved sidewalls (or apex edges) 27. Each flat sidewall is provided inside with two widely spaced pairs of closely spaced narrow bosses 32. The bosses nearer the center of the flat sidewall are shorter lengthwise than the flanking ones. Varistor 10, shown exploded outside the housing in FIG. 2A, is indicated in broken lines inside the housing and adjacent a sidewall in FIG. 2B.

Visible in FIGS. 2A and 2B within the internal end of the base or bottom fitting 28 are potting material 24 (electrically non-conductive but thermally conductive), short ground terminal 35, emerging from the potting material into and protruding through slot 38 in triangular disklike piece 26 of foamed insulation (when assembled), and an emergent pair of distributed resistance fuse links 21 and 29. Disklike varistors 10 (each with an insulating collar 10') rest edgewise upon the bosses adjacent respective sidewalls inside the housing. The varistor face nearest the wall overlies an end portion of an adjacent fuse link, in conductive contact (electrical and thermal) with a flat side of such fuse link.

During assembly, three-lobed resilient grounding insert 33 is compressed sufficiently to slide into the housing, where two of the lobes will contact the available face of the respective varistors opposite the face contiguous with the adjacent fuse link. Then the cover is fitted onto the top of the housing and is sealed thereto in any suitable manner, as adhesively, by dielectric heating, etc.

Figure 3A:
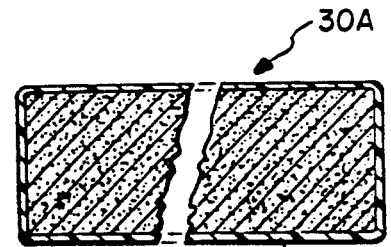
FIGS. 3A, 3B, and 3C are enlarged transverse sectional detail views of embodiments of distributed-resistance fuse link useful in apparatus of the preceding views.
Figure 3B:
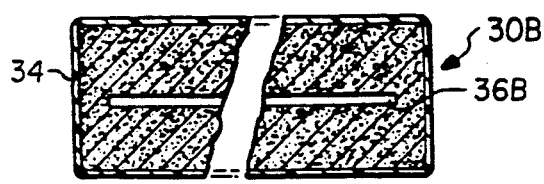
Figure 3C:
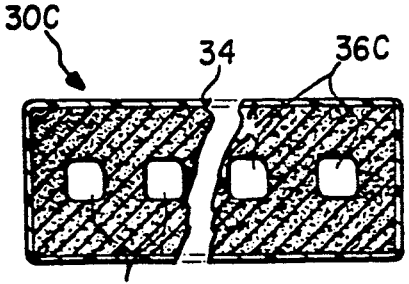

FIGS. 3A, 3B, and 3C show in transverse cross-section, and greatly enlarged, alternative embodiments of distributed-resistance links 30A, 30B, and 30C according to this invention. Each fuse link has a thin flexible covering 34 of insulation, composed of fabric, plastic film, rubber, or the like. For good electrical contact with the varistors the fuse links preferably have a rectangular section. Fuse link 30A is shown as solid metal; fuse link 30B has hollow or slotted core 36B; and fuse link 30C has a series of spaced tubular openings 36C extending longitudinally therein.

A current overload sufficient to melt the fusible composition of the distributed resistance fuse links (or other fusible material inside the housing) also burns associated insulation and coats the translucent housing window with soot, as can be confirmed at a glance, indicating that the surge protection is no longer functioning and that the unit should be removed for maintenance and/or be replaced by a fresh one. This seems preferable to making the entire housing translucent, which would necessitate cleaning or replacing the whole sooted housing.

The components and materials used according to this invention are conventional in themselves and are readily available. Adequate housings may be made of any of many polymeric materials of suitably high degradation temperature and electrical non-conductivity. Epoxy resin or other suitable polymer may be reinforced with glass fibers, if desired. The illustrated housing is similar to that of Reitz U.S. Pat. No. 4,439,807 mentioned above and sold by General Electric Co.

Translucent—optionally transparent—windows for such housings may be made of methyl methacrylate or similar materials meeting the requirements for such non-conductive housings. Like the housing sidewalls, the windows are conveniently several millimeters thick. Their combination of thickness and clarity should be such that smoke deposited upon their inside surface will be apparent from outside.

Varistors are available from well known sources, such as under the brand name Panasonic. Other varistor sources include General Electric, McGraw-Edison, and Siemens. Varistors are conveniently disklike and in this described apparatus (and/or use) preferably are not covered, measure about several centimeters in diameter, about several millimeters thick, and weigh on the order of a dozen grams (plus or minus about half as much for each measure or dimension).

Material for fuse links of distributed-resistance type is available in bulk (sometimes called "fuse wire") from Action Fuse, Bussman, and Littlefuse, for example. Such material in composition is rather similar to solder, being composed of fusible material, such as an alloy mainly made up of tin and lead, with perhaps traces of less common metals.

Where, as shown, such distributed-resistance fuse links are desired to be contiguous with the varistor faces, rectangular transverse cross-sections are favored over round--which may be preferred where other contact methods and means are employed. In physical dimensions, such fuse links may range from about a millimeter to several centimeters in thickness and width if rectangular, and usually about several millimeters in diameter if circular. The aspect ratio of such rectangular fuse links may range from about 1:1 to as much as about 10:1 or so. An intermediate aspect ratio of about 5:1 or 6:1 is generally suitable. The optimal cross-section depends upon the type of circuitry used and/or the actual type of surge duty and may be readily determined empirically.

The preferred length of such fuse links is a function of cross-section and specific resistivity (resistance per unit length), as well as the desired steady-state or "surgeless" current to be conducted. Although transient surges are drastically different in amplitude and duration from conventional power line frequencies and voltages, as a rule of thumb they may be selected to correspond to a conventional rating, such as 30 amperes, at normal power conditions. A length from about several centimeters to a dozen or so centimeters is suitable, and about a half dozen centimeters is often suitable.

The regularity in resistance provided by such fuse links should not be sacrificed—as otherwise may occur—when they are attached to terminals or lead-in wires. Conventional crimping may impart an undesirable high-resistance bottleneck to current flow—that under surge conditions can fail, incapacitating an otherwise functional apparatus. "Nicropress" or similar techniques previously used for non-electrical connections should be employed to minimize distortion in connecting the relatively soft distributed-resistance fuse links to other conductors, so as not to introduce hot spots characteristic of localized-resistance over-current fuses.

Variants in the apparatus and method of this invention have been suggested in this specification, and other modifications may be made, as by adding, combining, subdividing, or deleting parts or steps, while retaining at least some of the advantages and benefits of the invention—which itself is defined in the following claims.

I claim:

1. In a method of preventing transient electrical surges, received in a circuit from an upstream power source, from going downstream, including shunting resulting surge currents to ground via over-voltage means including a disklike varistor with a conductive face, the improvement comprising
   providing a housing substantially surrounding such over-voltage means, having at least one sidewall and furnished with leads from the power source, and juxtaposing such varistor face adjacent the sidewall; and
   providing, between the power source and the over-voltage means, conductive fusible means including a distributed-resistance fuse link having its electrical resistance distributed substantially evenly along its length, establishing electrical contact of a side of such fuse link with such varistor face, and sandwiching an end portion of such distributed-resistance fuse link between such face of the varistor and such sidewall.

2. Surge-protection method according to claim 1, including the step of providing such end portion of such distributed-resistance fuse link between such face of the varistor and such sidewall with a rectangular transverse cross-section.

3. Apparatus adapted to protect electrical apparatus downstream from an upstream power source subject to lightning or other electrical transient source from resulting voltage surges in electrical power leads to such downstream apparatus, comprising a housing having an electrically non-conductive inside wall and, within the housing.

a varistor having a conductive face adjacent such wall, connectable between such an electrical power lead and ground, and adapted to clip surge voltages and to shunt resulting surge currents to an available ground, and a fuse link having its electrical resistance distributed substantially evenly along its length, connectable between such an electrical power lead and such varistor, and in part contiguous with such varistor face and sandwiched between the varistor and such adjacent wall.

4. Surge-protective apparatus according to claim 3, wherein such fuse link is substantially rectangular in transverse cross section, with one of its wide sides contiguous with such varistor.

* * * * *